United States Patent
Jung

[19]

[11] Patent Number: 6,001,052

[45] Date of Patent: Dec. 14, 1999

[54] METHOD FOR HANDLING CALL HOLD SERVICE FOR USE IN A CDMA SWITCHING SYSTEM

[75] Inventor: Hyun-Sook Jung, Incheon, Rep. of Korea

[73] Assignee: Daewoo Telecom, Ltd., Incheon, Rep. of Korea

[21] Appl. No.: 08/975,714

[22] Filed: Nov. 21, 1997

[30] Foreign Application Priority Data

Dec. 31, 1996 [KR] Rep. of Korea ............... 96-82538

[51] Int. Cl.⁶ ................................................ H04Q 7/08
[52] U.S. Cl. ...................... 485/416; 455/414; 379/215
[58] Field of Search .................................. 455/414, 415, 455/416, 417, 422, 445, 458; 379/210, 211, 212, 213, 214, 215, 202, 373; 370/259, 215, 58.1, 58.2

[56] References Cited

U.S. PATENT DOCUMENTS

| | | |
|---|---|---|
| 4,947,421 | 8/1990 | Toy et al. .......................... 379/67 |
| 5,418,846 | 5/1995 | Yuasa ............................... 379/215 |
| 5,590,183 | 12/1996 | Yoneda et al. ..................... 379/142 |
| 5,680,447 | 10/1997 | Diamond et al. .................. 379/215 |
| 5,818,819 | 10/1998 | Hallock et al. .................... 370/259 |
| 5,828,744 | 10/1998 | Nemoto ............................ 379/215 |

*Primary Examiner*—Wellington Chin
*Assistant Examiner*—Pablo Tran
*Attorney, Agent, or Firm*—Pennie & Edmonds LLP

[57] ABSTRACT

A call hold handling method for use in an electronic switching system employed in a CDMA communications system comprises the steps of: a) receiving hook flash and numeric digits of the third party from the first party; b) sending hold tone to the second party; c) performing a number translation of the numeric digits; d) checking subscription type of the third party; e) occupying a trunk line and going to step h) if the checking at step d) results in a conventional telephone subscriber; f) requesting and receiving a call processing information from the call hold handler if the checking at step d) results in a wireless subscriber; g) paging the third party if the checking at step d) results in a wireless subscriber; h) connecting the first party and the third party; and i) sending ring-back tone to the third party.

4 Claims, 7 Drawing Sheets

METHOD FOR HANDLING CALL HOLD SERVICE FOR USE IN A CDMA SWITCHING SYSTEM

FIELD OF THE INVENTION

The present invention relates to a Code Division Multiple Access communications system; and, more particularly, to a method for handling call hold service for use in a Code Division Multiple Access switching system.

BACKGROUND OF THE INVENTION

A telephone subscriber engaged in an ongoing conversation with a second party may place a new call to a third party while placing the call with the second party on hold.

A so-called "call hold" service, one of supplementary services provided by a telephone operating company, has conventionally accommodated the above-mentioned service feature. The call hold service has been typically implemented in and provided by a switching system at a central office.

In recent years, meanwhile, the popularity of wireless communications has grown immensely and the growth is expected to continue further in the future. Known as a rather efficient wireless communications system is a CDMA(Code Division Multiple Access) communications system.

Referring to FIG. 1, there is shown a simplified structure of a CDMA communications system. The CDMA communications system interfaces to a Public Switched Telephone Network(PSTN) 14 on one side and to a mobile station(MS) 10 on the other side. The CDMA communications system is comprised of four major elements: the MS 10, a base station(BS) 11, a base station controller(BSC) 12, and a mobile switching system(MSS) 13.

The MS 10, a so-called cellular phone, a terminal equipment, provides communication access for cellular users to communicate with each other or with PSTN users.

The BS 11 is a link between the MS 10 and the BSC 12 and provides a common air interface to the MS 10.

The BSC 12 contains resources providing a channel between the BS 11 and the MSS 13. The BSC 12 performs functions such as: providing communication gateway between different BSs; processing and reformatting the data from the BS 11 to the MSS 13, and vice versa; and controlling call processing and signalling with the MSS 13.

The MSS 13 is a link between the BSC 12 and the PSTN 14. The MSS 13 provides switching functions required to properly pass data between the BSC 12 and PSTN 14. The MSS 13 may also include other functions or systems, including but not limited to, the operation and management, a home location register, a visitor location register, and an authentication center.

On the other hand, it is commonplace that a wireless customer demands the supplementary services such as a call hold service.

The MSS 13 is required to provide various supplementary services such as the call hold service as a conventional switching system has provided with.

There has been provided a procedure for handling the call hold service for conventional telephone subscriber by the conventional switching system. However, there has not been provided a call hold procedure applicable for the mobile switching system employed in the CDMA communications system.

SUMMARY OF THE INVENTION

It is, therefore, a primary object of the present invention to provide procedure for handling a call hold service for a mobile switching system employed in a Code Division Multiple Aces communications system.

In accordance with the present invention, there is provided a call hold handling method for use in an electronic switching system employed in a wireless communications system, the electronic switching system being equipped with a call processing subsystem and a call hold handler, wherein the call hold refers to a service provided by the electronic switching system such that a wireless phone subscriber, a first party, engaged in an existing conversation with a second party places a new call to a third party while placing the second party on hold, the method comprising the steps of: a) receiving hook flash and numeric digits of the third party from the first party; b) sending hold tone signal to the second party; c) performing a number translation of the numeric digits; d) checking subscription type of the third party; e) occupying a trunk line and going to step h) if the checking at step d) results in a conventional telephone subscriber; f) requesting and receiving a call processing information from the call hold handler if the checking at step d) results in a wireless subscriber; g) paging the third party if the checking at step d) results in a wireless subscriber; h) connecting the first party and the third party; and i) sending ring-back tone signal to the third party.

BRIEF DESCRIPTION OF THE DRAWINGS

The above and other objects and features of the present invention will become a parent from the following description of preferred embodiments given with reference to the accompanying drawings, in which.

DETAILED DESCRIPTION OF THE PREFERRED EMBODIMENT

Figure 1:
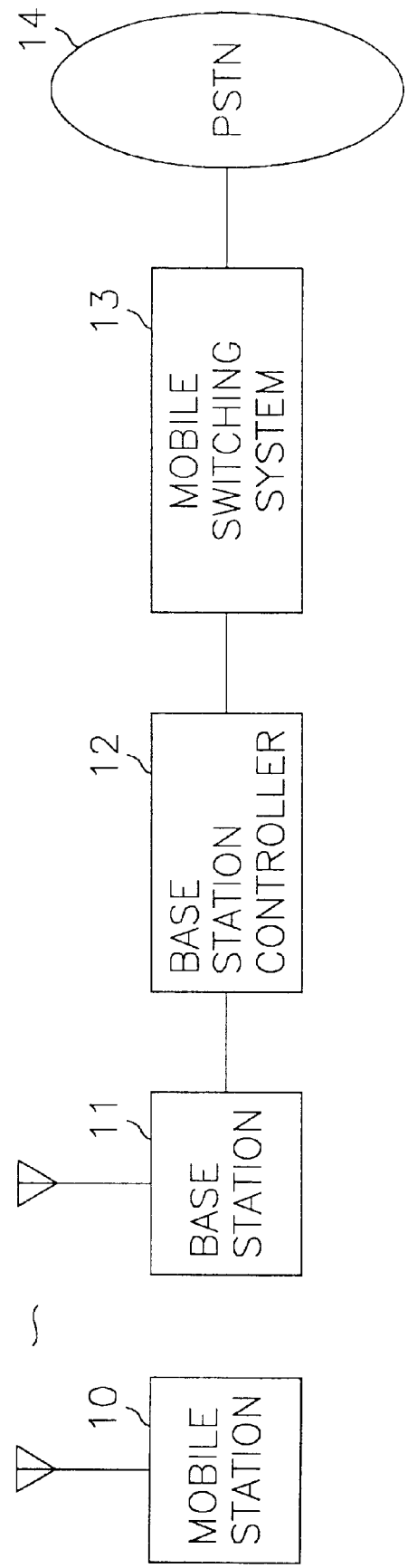
FIG. 1 outlines a cellular communications system.
Figure 2:
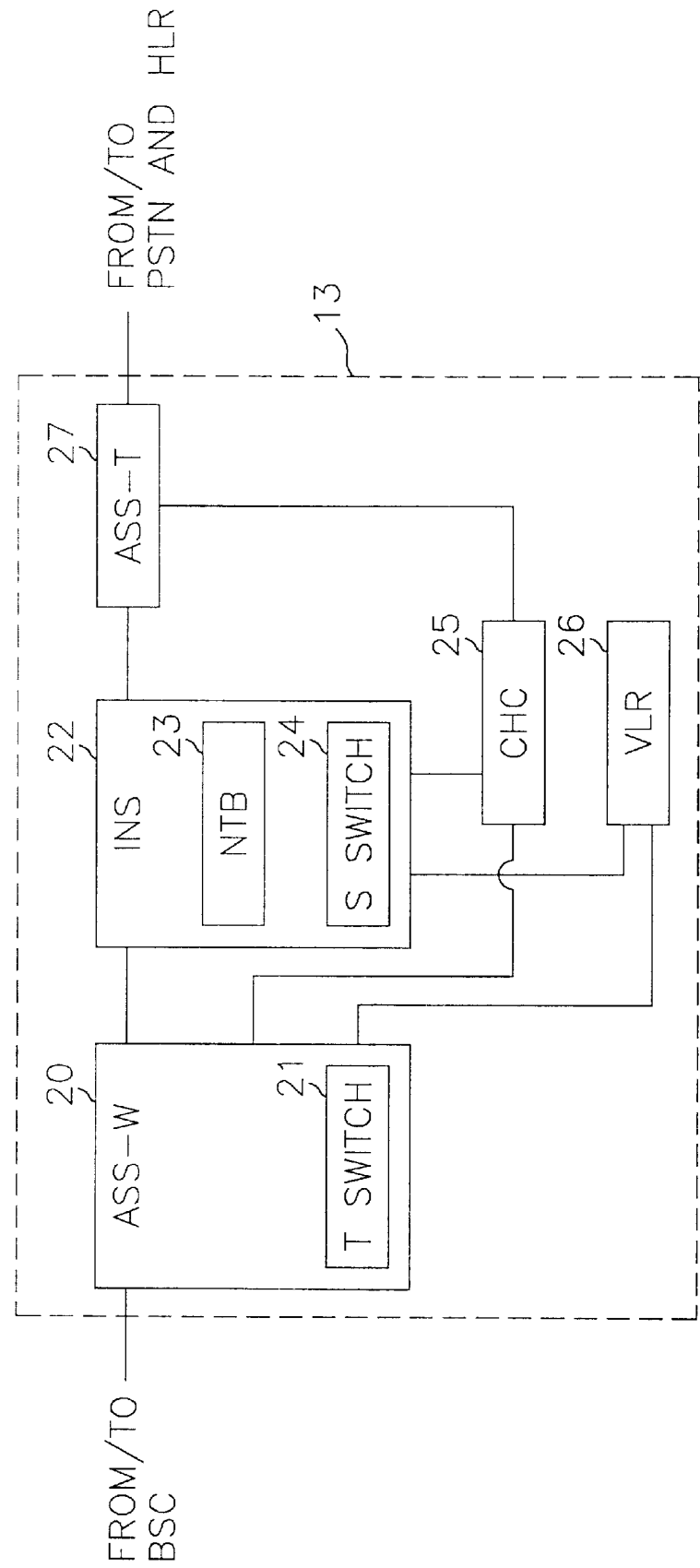
FIG. 2 describes a block diagram of an inventive call hold handling apparatus.

FIG. 2 illustrates 5 a call hold handling apparatus in accordance with the present invention.

An ASS-W(Access Switching Subsystem for Wireless subscriber) 20 communicates with the BSC 12 and an INS(Interconnection Network Subsystem) 22, performs call processing, controls cell flow, performs time switching, and the like.

The INS 22, connected to a plurality of ASS-WS, is designed for performing space switching, network synchronization, and the like. The INS 22 includes an NTB(Number Translation Block) 23 for translating digits dialed by a caller and a space switch 24 used for routing a requested call to a destination.

A VLR(Visitor Location Register) 26 is designed for managing information of the MS''s currently under the concerned MSS's service area. Information in the VLR 26 is updated according to the movement of the MS 10.

An ASS-T(Access Switching Subsystem for Trunk) 27 is for adapting the MSS 13 to a PSTN(Public Switched Telephone Network) 14 and for exchanging data between the MSS 13 and the PSTN 14.

To the ASS-T 27, a HLR(Home Location Register) (not shown) is linked. The HLR stores information on all the MS's employed in the CDMA communications system such as subscription parameters and location information.

A call hold control(CHC) 25 interfaces with the ASS-W 20, the ASS-T 27 and the INS 22 and supervises procedures for handling the call hold'service.

Hereinafter, with reference to FIG. 2 and FIGS. 3A, 3B, 4 to 6, an inventive call hold handling procedure will be described.

For illustrative purpose, it is assumed that: a subscriber A is a customer subscribed for the call hold service; the subscriber A and another subscriber B have been engaged in a conversation when the subscriber A wants to be served with the call hold service; the subscriber A wants to call another subscribes C, while placing the subscriber B on hold; the subscriber A is being served by the ASS-W 20; the type of terminal of the subscriber A is an MS(mobile station) but the others are not limited, i.e., either the MS or the conventional telephone. Regarding the talk between the subscriber A and the subscriber B, it doesn't matter which one initiated the call.

Figure 3A:
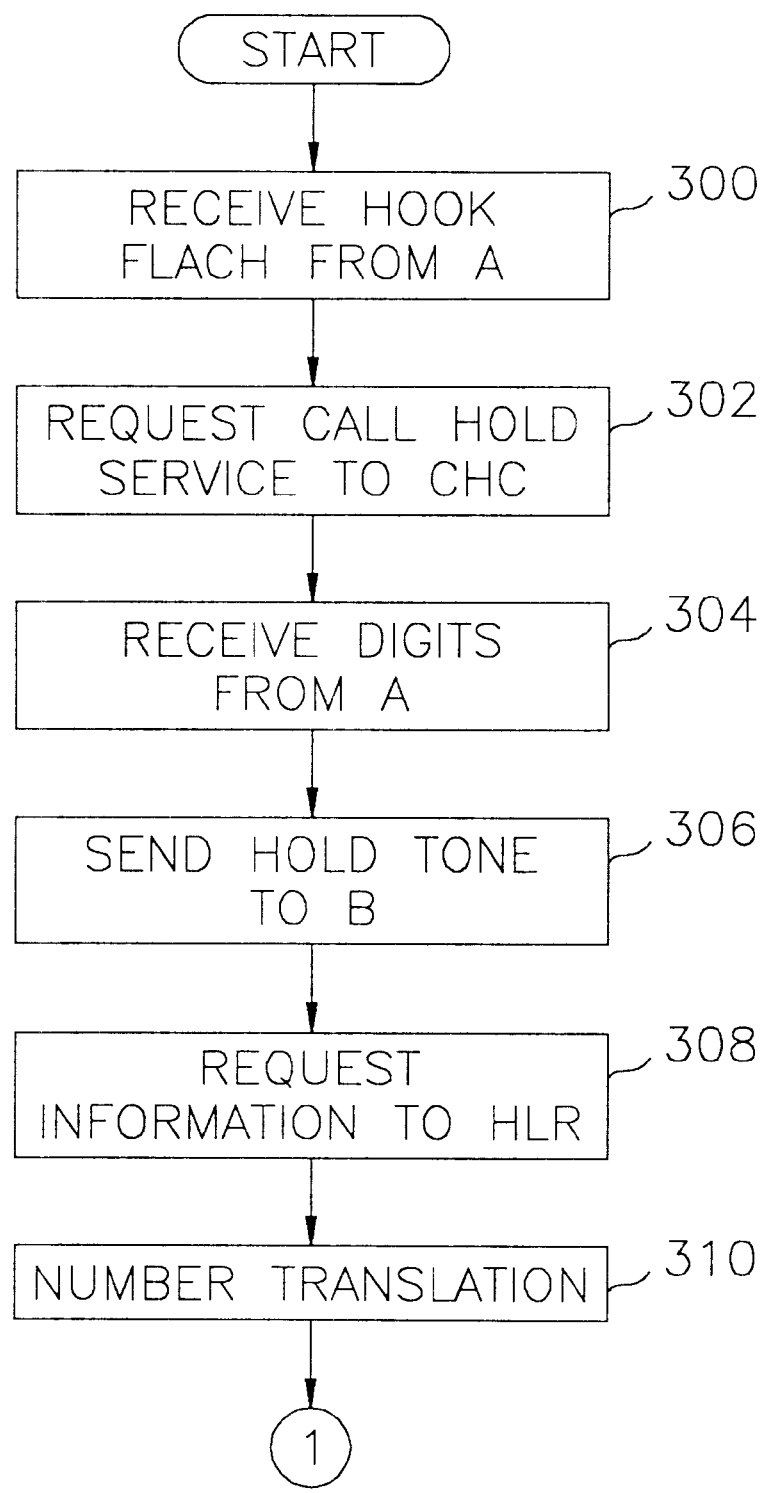
FIGS. 3A and 3B illustrate a flow chart describing an inventive call hold handling procedure.
Figure 3B:
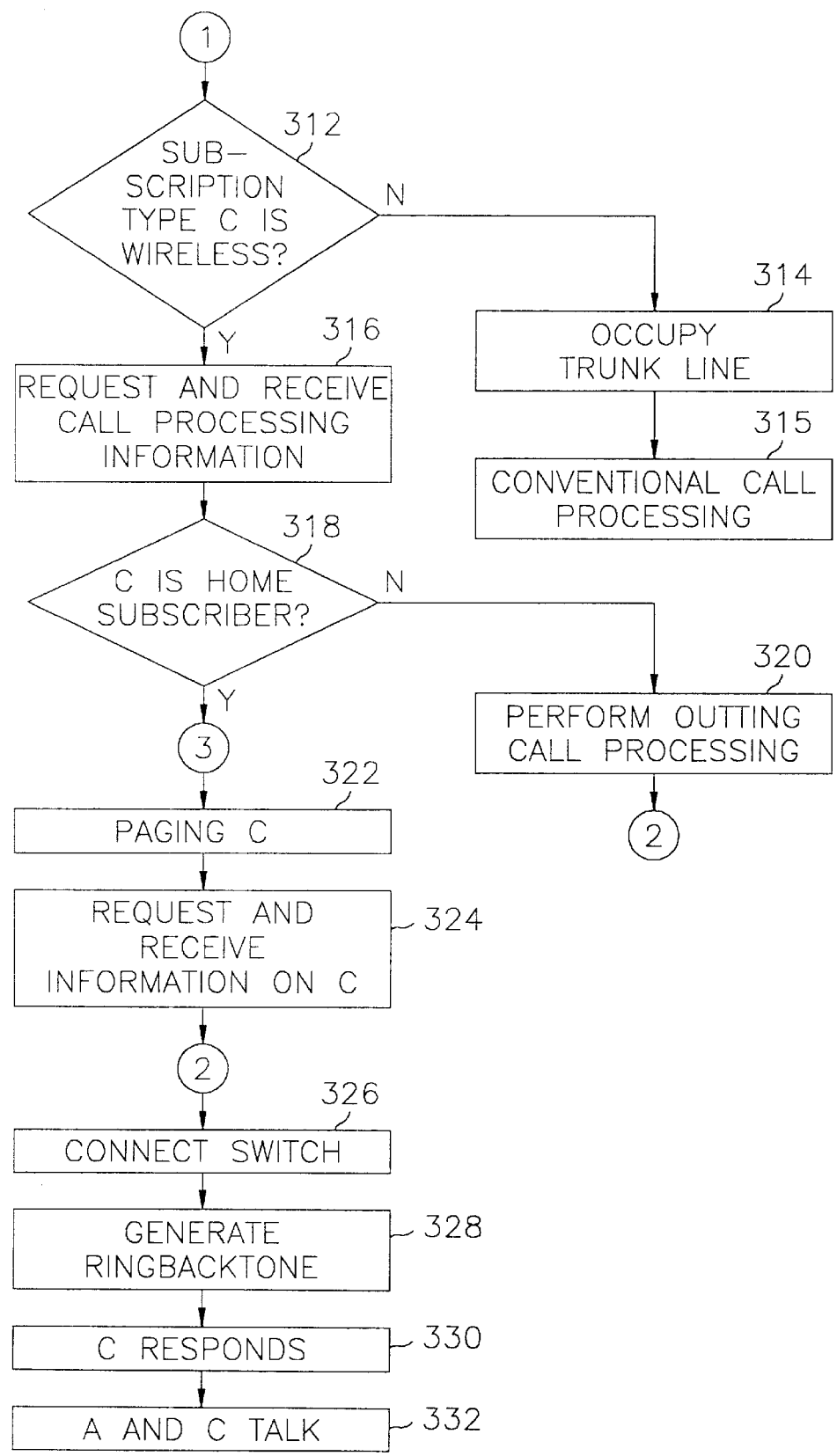

First, FIGS. 3A and 3B illustrate a call hold procedure in the event that the subscriber A wants to call the subscriber C while being engaged in a conversation with the subscriber B.

At step 300, the Subscriber A sends a hook flash signal to the BSC 12. The AS-W 20 receives the hook flash signal from the BSC 12. Then, at step 302, the hook flash signal is received by the CHC 25. The hook flash signal is regarded as a call hold request signal by the CHC 25. Subsequently, at step 304, the ASS-W 20 receives digits dialed by the subscriber A through the BS 11 and the BSC 12. The ASS-W 20 sends a hold tone signal to the subscriber B noticing that the subscriber B is put on hold at step 306.

The CHC 25 sends inquiries and information to the HLR via the ASS-T 27 at step 308. The inquiries include, e.g., whether the subscriber A has subscribed for the call hold service, and whether the subscriber A is qualified; the information includes a mobile identification number of the subscriber A, digits dialed by the subscriber A, and the like.

At step 310, the WTB 23 performs a number translation with respect to the digits corresponding to the phone number of the subscriber C.

The result of the number translation at step 310 is checked at step 312. If the subscriber C is determined to be a wireless subscriber at step 312, the MSS 13 requests and receives information for routing to the HLR at step 316. If the subscriber C is determined not to be a wireless subscriber, e.g., a conventional telephone subscriber, then the ASS-T 28 occupies a trunk line for routing at step 314 and the MSS 13 performs a conventional call processing at step 315.

At step 318, it is checked if the subscriber C is a home subscriber, wherein a home subscriber refers to a wireless subscriber under the supervision of the concerned MSS 13. If the subscriber C is determined not to be a home subscriber at step 318, the MSS performs outgoing call processing at step 320 and goes to step 326. If it is determined that subscriber C is a home subscriber at step 318, the MSS 13 requests paging the subscriber C at step 322. Then, the MSS requests information on the subscriber C to the VLR 26 and receives the information from the VLR 26 at step 324. The MSS 13 makes connection at the T switch 21 and at the S switch 24, thereby, in turn, connecting the subscriber A and the subscriber C at step 326. At step 328, the MSS 13 sends a ring-back tone signal to the subscriber C so as to apprise the subscriber C of an incoming call. If the subscriber C responds to the ring-back tone signal at step 330, the subscriber A and the subscriber C start to engage in a talk at step 332.

Figure 4:
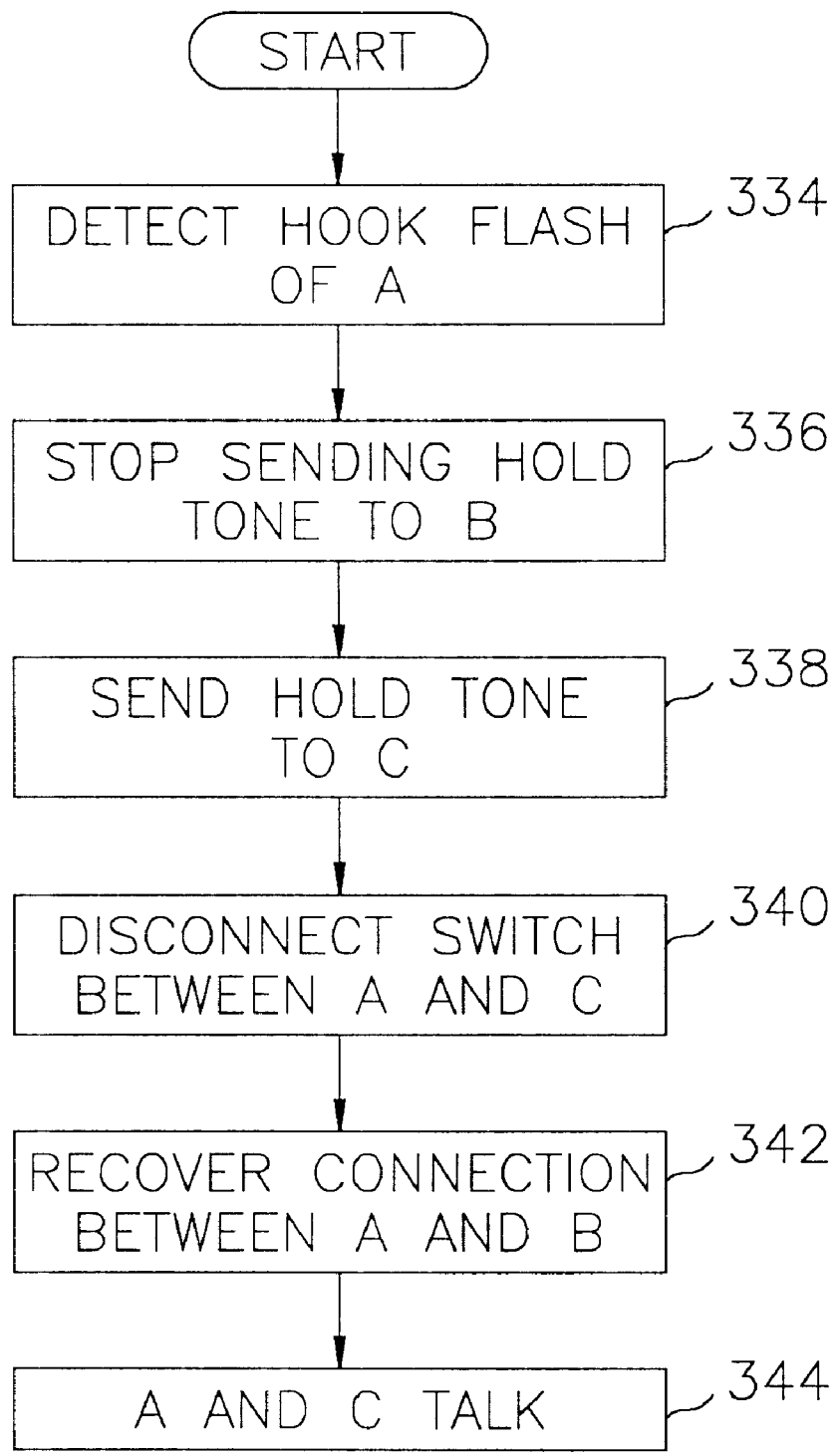
FIG. 4 describes flow chart describing an inventive call hold handling procedure applied to the event that a first party recovers conversations with a second party after placing a third party on hold.

FIG. 4 shows a call hold handling procedure applied to the event that the subscriber A resumes the conversation with the subscriber B after placing the subscriber C on hold.

Upon detecting a hook flash signal from the subscriber A at step 334, the MSS 13 ceases the hold tone signal currently being sent to the subscriber B at step 336, and subsequently, sends a bold tone signal to the subscriber C at step 338. At step 340, the MSS 13 blocks the connection at the T switch 21 and at the S switch 24 so as to disconnect the subscriber A from the subscriber C, and, then, recover the connection between the subscriber A and the subscriber B at step 342. A talk line between the subscriber A and the subscriber B is reestablished at step 344.

Figure 5:
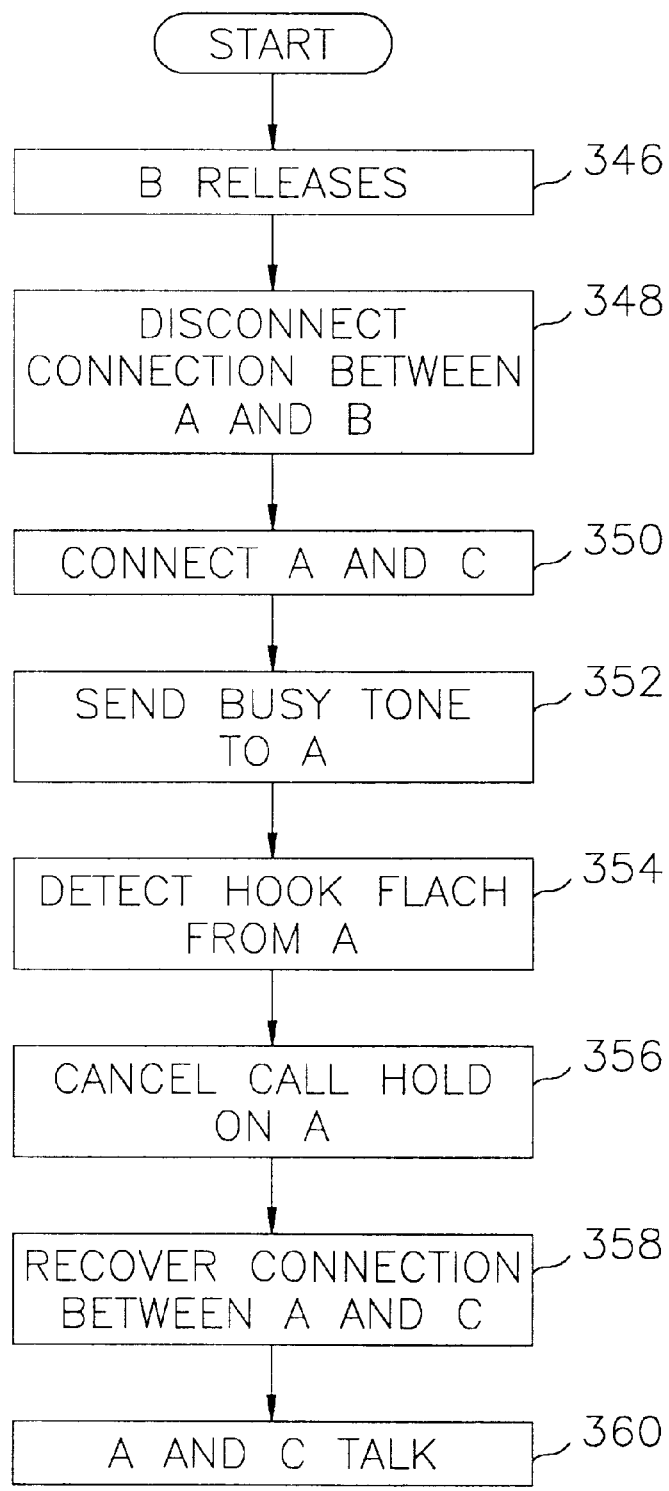
FIG. 5 describes a flow chart describing an inventive call hold handling procedure applied to the event that the second party releases the call with the first party while placing the third party on hold.

FIG. 5 describes a call hold handling procedure applied to the event that the subscriber B releases the call with the subscriber A while placing the subscriber C on hold.

The subscriber B releases the call with the subscriber A at step 346, the MSS 13 disconnects the subscriber A from, the subscriber B at step 348 by blocking the connections at the T switch 21 and at the S switch 24. Then, the MSS 13 connects the subscriber A to the subscriber C by making connection at the T switch 21 and at the S switch 24 at step 350. The MSS sends a busy tone signal to the subscriber A at step 352, wherein the busy tone signal is devised for apprising the subscriber A of the release of the subscriber B. The subscriber A hangs up the phone in response to the busy tone signal by issuing the hook flash signal, and the MSS 13 detects the hook flash signal at step 354. The MSS 25 cancels the call hold state of the subscriber C at step 356 and recover the connection between the subscriber A and the subscriber C at step 358. Finally, the subscriber A and the subscriber C start to talk on the line at step 360.

Figure 6:
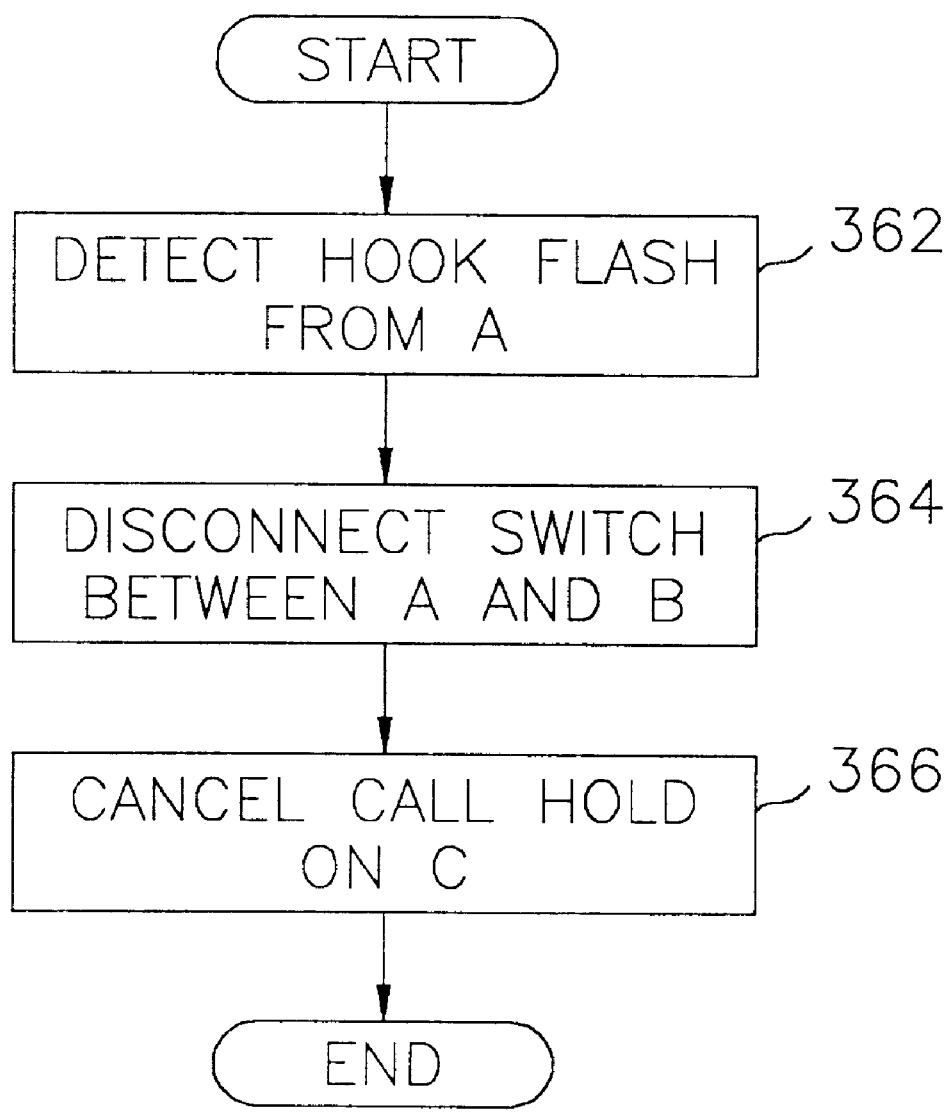
FIG. 6 describes a flow chart describing an inventive call hold handling procedure applied to the event that the first party releases the call in the middle of talking with the second party while placing the third party on hold.

FIG. 6 shows a procedure applied to the event that the subscriber A releases the call in the middle of conversation with the subscriber B while placing the subscriber C on hold.

If subscriber A issues a hook flash signal at step 362, the MSS 13 blocks the connections at the T and S switches 21, 24 connecting the subscriber A to the subscriber B at step 364, subsequently. Then, the MSS 13 cancels the call hold state of the subscriber C at step 366.

While the present invention has been described with respect to the preferred embodiments, other modifications and variations may be made without departing from the scope and spirit of the present invention as set forth in the following claims.

What is claimed is:

1. A call hold handling method for use in an electronic switching system employed in a wireless communications system, the electronic switching system being equipped with a call processing subsystem and a call hold handler, wherein the call hold refers to a service provided by the electronic switching system such that a wireless phone subscriber, a first party, engaged in an ongoing conversation with a second party places a new call to a third party while placing the second party on hold, the method comprising the steps of:

a) receiving a hook flash signal and numeric digits of the third party from the first party;

b) sending a hold tone signal to the second party;

c) performing a number translation of the numeric digits;

d) checking subscription type of the third party;

e) occupying a trunk line and going to step h) if the checking at step d) results in a conventional telephone subscriber;

f) requesting and receiving a call processing information from the call hold handler if the checking at step d) results in a wireless subscriber;

g) paging the third party if the checking at step d) results in a wireless subscriber;

h) connecting the first party with the third party; and i) sending ring-back tone to the third party.

2. The call hold handling method of claim 1, wherein, so as to handle an event that the first party resumes the conversation with the second party after placing the third party on hold, the method further comprising the steps of:

j) receiving a hook flash signal from the first party;

k) stopping to issue the hold tone signal to the second party;

l) sending the hold tone signal to the third party;

m) disconnecting connection between the first and the third party; and n) recovering a connection between the first and the second party.

3. The call hold handling method of claim 2, wherein, so as to apply for an event that the second party releases a call with the first party while placing the third party on hold, the method further comprising the steps of:

o) receiving a hook-on signal of the second party;

p) disconnecting the connection between the first party and the second party;

q) connecting the first party to the third party;

r) sending a busy tone signal to the first party;

s) receiving a hoot-on signal of the first party;

t) canceling the call hold service from the first party; and u) recovering the connection between the first and the third party.

4. The call hold handling method of claim 3, wherein, so as to apply for an event hat the first party releases the call in the middle of a conversation with the second party while placing the third party on hold, the method further comprising the steps of:

v) receiving a hook on signal of the first party;

w) disconnecting the connection between the first and the second party; and x) canceling the call hold on the third party.

* * * * *